(No Model.)
N. E. ROBINSON.
COOKING UTENSIL.
No. 314,057. Patented Mar. 17, 1885.
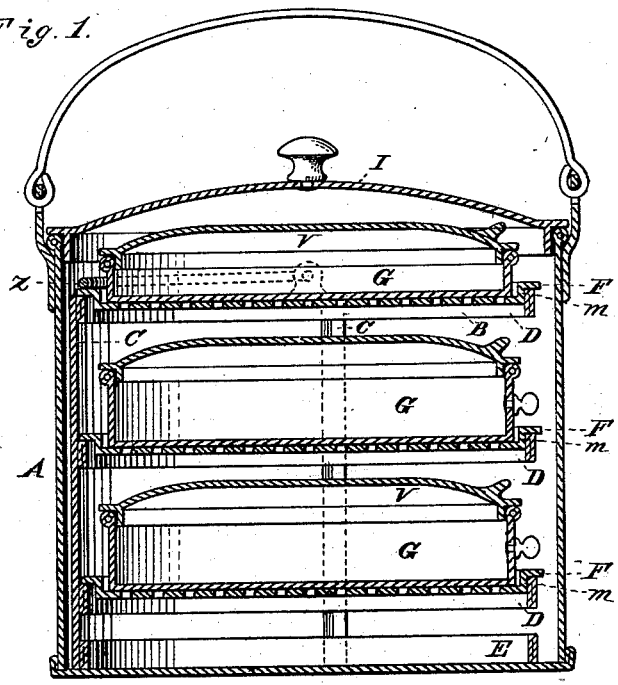
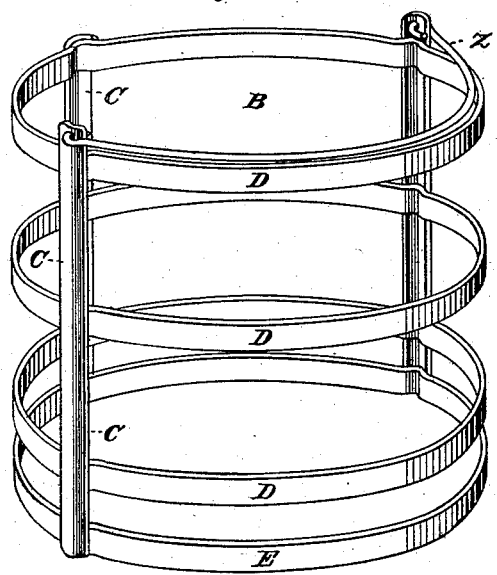
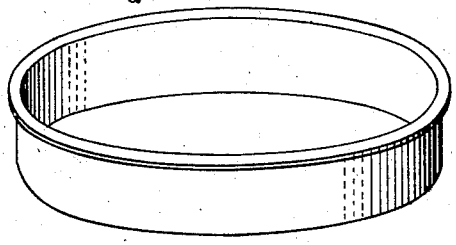
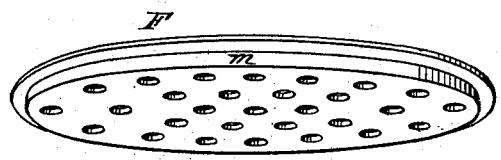
WITNESSES
Villette Anderson.
Philip C. Masi.
INVENTOR
Nannie E. Robinson,
by Anderson & Smith
her ATTORNEYS
N. PETERS, Photo-Lithographer, Washington, D. C.

UNITED STATES PATENT OFFICE.

NANNIE E. ROBINSON, OF LAMONT, MICHIGAN.

COOKING UTENSIL.

SPECIFICATION forming part of Letters Patent No. 314,057, dated March 17, 1885.

Application filed April 18, 1884. (No model.)

*To all whom it may concern:*

Be it known that I, NANNIE E. ROBINSON, a citizen of the United States, residing at Lamont, in the county of Ottawa and State of Michigan, have invented certain new and useful Improvements in Cooking Utensils; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a vertical section. Fig. 2 is a perspective view of the skeleton frame. Fig. 3 is a perspective view of one of the pans. Fig. 4 is a perspective view of one of the rests, looking on the under side.

This invention has relation to cooking utensils; and it consists in the construction and novel arrangement of devices, as hereinafter set forth, and pointed out in the appended claims.

In the accompanying drawings, the letter A designates the outer kettle or vessel.

B represents a skeleton frame having three or more uprights, C, to which are secured the rings D at intervals from the bottom or base ring, E.

On the rings D are placed rests F, which may be made of wire-cloth or perforated metal. These rests are usually made with raised margins m, to engage the rings, their central portions being depressed to form seats for the pans G, which are adapted to be placed thereon, the interval between the upright C on one side of the frame being made sufficiently wide to admit the pans or permit their removal.

In using this utensil a little water is poured in the bottom of the kettle, and the articles to be cooked having been placed in the pans the latter are put in the skeleton frame, and this is lowered by its bail Z into the vessel A, which is then placed over the fire.

The pans are preferably provided with covers v, and a cover, I, is placed upon the main vessel or kettle. With this utensil is usually provided a deep pan adapted to descend from the upper ring to near the base-ring, for use in boiling bulky articles, making soups, &c., when the small pans are removed.

This cooking apparatus, although of simple construction, will be found very convenient and useful. It is much more delicate than the ordinary boiling and stewing utensils which are placed upon the fire without an intervening water layer.

In this utensil the articles being cooked cannot burn, and therefore the undivided attention of the operator is not required.

Having described this invention, what I claim, and desire to secure by Letters Patent, is—

1. The skeleton frame consisting of the uprights C, open on one side, and the series of rings D, in combination with the perforated rests F, and the pans G, substantially as specified.

2. The cooking utensil consisting of the water-vessel A, and therein the removable skeleton frame consisting of the uprights C and rings D E, the perforated rests F, the pans G, and the bail Z, substantially as specified.

In testimony whereof I affix my signature in presence of two witnesses.

NANNIE E. ROBINSON.

Witnesses:
 REUBEN RANDALL,
 JOS. J. ROBINSON.